(12) United States Patent
Yu

(10) Patent No.: US 9,616,333 B1
(45) Date of Patent: Apr. 11, 2017

(54) METHOD FOR CAPTURING AND IMPLEMENTING BODY MOVEMENT DATA THROUGH A VIDEO GAME ENGINE

(71) Applicant: Chun Hung Yu, Markham (CA)

(72) Inventor: Chun Hung Yu, Markham (CA)

(*) Notice: Subject to any disclaimer, the term of this patent is extended or adjusted under 35 U.S.C. 154(b) by 0 days.

(21) Appl. No.: 15/268,346

(22) Filed: Sep. 16, 2016

Related U.S. Application Data

(63) Continuation-in-part of application No. 15/001,704, filed on Jan. 20, 2016, now Pat. No. 9,468,844.

(51) Int. Cl.
| | | |
|---|---|---|
| A63F 13/211 | (2014.01) | |
| A63F 13/212 | (2014.01) | |
| A63F 13/235 | (2014.01) | |

(52) U.S. Cl.
CPC .......... *A63F 13/211* (2014.09); *A63F 13/212* (2014.09); *A63F 13/235* (2014.09); *A63F 2300/105* (2013.01); *A63F 2300/1012* (2013.01); *A63F 2300/1031* (2013.01)

(58) Field of Classification Search
CPC ........ A63F 13/20; A63F 13/21; A63F 13/211; A63F 13/212; A63F 2300/10; A63F 2300/105
USPC ........................................... 463/36; 345/156
See application file for complete search history.

(56) References Cited

U.S. PATENT DOCUMENTS

| | | | | |
|---|---|---|---|---|
| 2007/0015558 A1* | 1/2007 | Zalewski | ................ | A63F 13/10 463/1 |
| 2008/0100588 A1* | 5/2008 | Nogami | .................. | G06F 3/016 345/173 |
| 2009/0069081 A1* | 3/2009 | Thorner | .................. | A63F 13/24 463/30 |
| 2010/0151942 A1* | 6/2010 | Horovitz | ................. | A63F 13/06 463/30 |
| 2015/0035743 A1* | 2/2015 | Rosener | .................. | G06F 3/014 345/156 |
| 2015/0084860 A1* | 3/2015 | Aleem | .................... | G06F 3/017 345/156 |

* cited by examiner

*Primary Examiner* — Allen Chan

(57) ABSTRACT

A method for capturing and implementing body movement data through a video game engine enables user body movement to be captured and implemented through a video game engine. Biometric data is also collected through a plurality of biometric sensors and used to manage a video game difficulty through the video game engine. User-registered data for the biometric data is also used to manage the video game difficulty as well as to manage the user's gameplay experience. The user-registered data is compared to collected data from the biometric data in order to manage the video game difficulty as well as provide the user with a unique and personalized gameplay experience. At least one sensory-enhancing device is used to further personalize and customize the user's gameplay experience as the user plays. The at least one sensory-enhancing device is activated through the video game engine to provide a customized gameplay experience.

20 Claims, 20 Drawing Sheets

Implementing a specified movement as the in-game movement through the video game engine, if the cost distance between the selected point and the corresponding point is less than a designated implementation threshold

FIG. 2

Implementing an alternative movement as the in-game movement through the video game engine, if the cost distance between the selected point and the corresponding point is greater than a designated implementation threshold

FIG. 3

Retrieving the prerecorded movement time series data from the computing device through the master microcontroller

FIG. 4

Wherein each of the plurality of IMUs is electronically connected to a corresponding microcontroller from the plurality of slave microcontrollers

FIG. 13

Wherein the master microcontroller is communicatively coupled to the computing device and the plurality of slave microcontrollers, and wherein the video game engine is installed onto a storage device of the computing device

FIG. 14

Wherein the plurality of IMUs includes a first wrist IMU, a second wrist IMU, a first ankle IMU, and a second ankle IMU

FIG. 16

Wherein each of the plurality of IMUs comprises at least one accelerometer and at least one gyroscope

FIG. 17

METHOD FOR CAPTURING AND IMPLEMENTING BODY MOVEMENT DATA THROUGH A VIDEO GAME ENGINE

The current application is a continuation-in-part (CIP) application of a U.S. non-provisional application Ser. No. 15/001,704 filed on Jan. 20, 2016.

FIELD OF THE INVENTION

The present invention relates generally to a method for increasing motion and biometric-based interactivity between video games and players. More specifically, the present invention is a method for capturing and implementing body movement data through a video game engine. The present invention also utilizes biometric data to manage the user's gameplay experience.

BACKGROUND OF THE INVENTION

The advancement of the video game industry has led to the emergence of new technologies that increase interactivity between video games and players. Virtual reality provides an immersive experience that places players into lifelike three-dimensional environments. Aside from being able to experience a virtual environment, players are typically able to interact with the environment as well. In addition to virtual reality, motion-based technology has become increasingly prevalent in video games. Players are typically required to wear or hold an electronic device that is capable of capturing their body movements and translating the body movements into corresponding actions within the video games. Motion-based technology greatly enhances the physical aspect of video games that traditionally only required physical user input through a controller device.

The present invention is a method for capturing and implementing body movement data through a video game engine. This enables a player's movements to be captured and translated to the video game engine. As such, the player's movements are able to influence the environment rendered by the video game engine. The player's movements are recognizable by the video game engine and are implemented through the video game engine within the game environment. The present invention also utilizes biometric data to manage a video game difficulty through the video game engine. The biometric data is also utilized to customize the user's gameplay experience as the user plays. The biometric data includes user-registered data and collected data that are compared and analyzed in order to customize the user's gameplay experience. In addition to managing the video game difficulty, the biometric data is utilized to enhance the user's gameplay experience through sensory enhancement such as the release of fragrance or mist.

BRIEF DESCRIPTION OF THE DRAWINGS

FIG. 2 is a flowchart depicting a secondary process that is followed by the present invention.

FIG. 3 is a flowchart depicting a secondary process that is followed by the present invention.

FIG. 4 is a flowchart depicting a secondary process that is followed by the present invention.

FIG. 13 is a flowchart depicting a secondary process that is followed by the present invention.

FIG. 14 is a flowchart depicting a secondary process that is followed by the present invention.

FIG. 16 is a flowchart depicting a secondary process that is followed by the present invention.

FIG. 17 is a flowchart depicting a secondary process that is followed by the present invention.

DETAIL DESCRIPTIONS OF THE INVENTION

All illustrations of the drawings are for the purpose of describing selected versions of the present invention and are not intended to limit the scope of the present invention.

The present invention is a method for capturing and implementing body movement data through a video game engine. The overall process that is followed by the present invention is shown in FIG. 1 while secondary processes that are followed by the present invention are shown in FIGS. 2-20.

Figure 1:
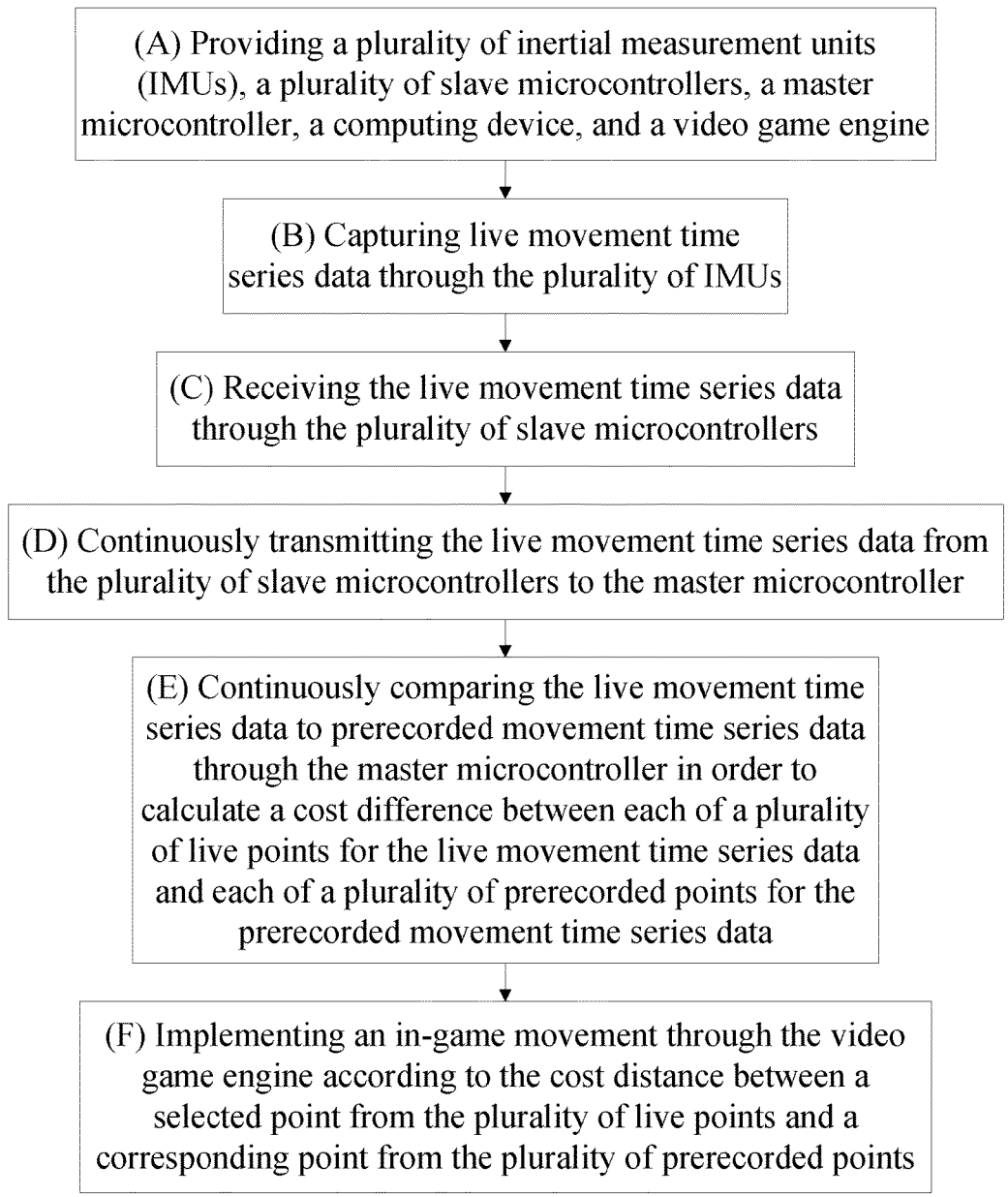
FIG. 1 is a flowchart depicting the overall process that is followed by the present invention.

With reference to FIG. 1, the present invention utilizes a plurality of inertial measurement units (IMUs) and a plurality of slave microcontrollers. The plurality of IMUs is worn on the user's body and captures data based on the user's movements that corresponds to movements within a video game engine. In the preferred embodiment of the present invention, each of the plurality of IMUs is electronically connected to a corresponding microcontroller from the plurality of slave microcontrollers as shown in FIG. 13. This allows the plurality of IMUs to be worn on multiple user body locations to more accurately capture data based on the user's movements. As shown in FIG. 16, the plurality of IMUs includes a first wrist IMU, a second wrist IMU, a first ankle IMU, and a second ankle IMU, allowing data to be captured from these user body locations. However, the plurality of IMUs may include additional IMUs for capturing data from other user body locations. Alternatively, there may be fewer IMUs as well. The plurality of IMUs may additionally be attached to a tennis racket, a step machine, or a similar sports accessory or item. This allows the plurality of IMUs to capture the user's movements when the user is using various accessories or items while playing. In the preferred embodiment of the present invention, each of the plurality of IMUs comprises at least one accelerometer and at least one gyroscope as shown in FIG. 17. The at least one accelerometer is able to detect the magnitude and direction of proper acceleration experienced by the user's body locations during movement. The at least one gyroscope functions in conjunction with the at least one accelerometer and is able to account for orientation as well as rotation of the user body locations as the user moves.

Figure 18:
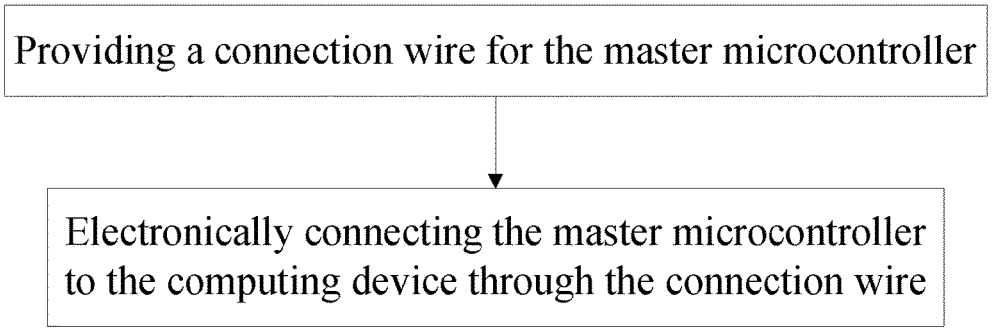
FIG. 18 is a flowchart depicting a secondary process that is followed by the present invention.
Figure 19:
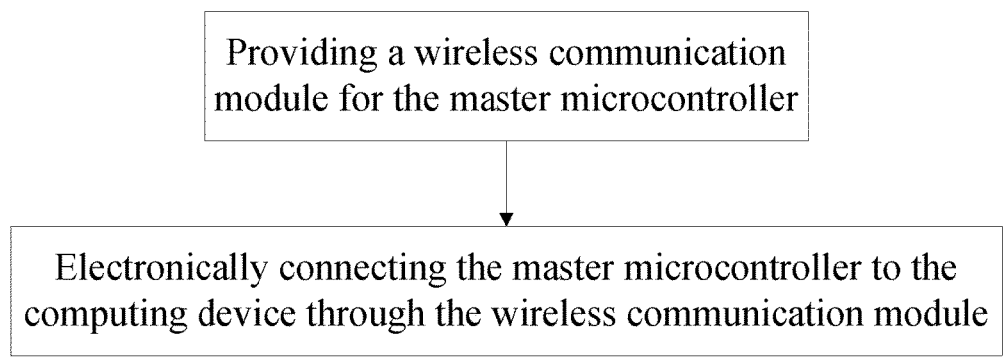
FIG. 19 is a flowchart depicting a secondary process that is followed by the present invention.

With continued reference to FIG. 1, the present invention further utilizes a master microcontroller and a computing device. As shown in FIG. 14, the video game engine is installed onto a storage device of the computing device, enabling the computing device to be utilized when playing a video game. The master microcontroller is communicatively coupled to the computing device and the plurality of slave microcontrollers, enabling feedback and two-way communication between the video game engine and the plurality of slave microcontrollers. The connection between the master microcontroller and the computing device may be wired via a connection wire as shown in FIG. 18. In this case, the master microcontroller is electronically connected to the computing device through the connection wire, forming a wired connection. Alternatively, the connection between the master microcontroller and the computing device may be wireless via a wireless communication module as shown in FIG. 19. In this case, the master microcontroller is electronically connected to the computing device through the wireless communication module, forming a wireless connection. In alternative embodiments of the present invention, the plurality of slave microcontrollers may be communicatively coupled directly to the computing device without a need for the master microcontroller.

With further reference to FIG. 1, live movement time series data is captured through the plurality of IMUs. The live movement time series data corresponds to the user's body movement that is captured in real-time while the user is playing. After the live movement time series data is captured, the live movement time series data is received through the plurality of slave microcontrollers. Because each of the plurality of IMUs is electronically connected to a corresponding microcontroller from the plurality of slave microcontrollers, the plurality of slave microcontrollers is able to receive the live movement data time series data from one or more user body locations on which the plurality of IMUs is worn. The live movement time series data is then continuously transmitted from the plurality of slave microcontrollers to the master microcontroller. The master microcontroller is thus able to aggregate the live movement time series data from multiple user body locations.

The live movement time series data is continuously compared to prerecorded movement time series data through the master microcontroller in order to calculate a cost distance between each of a plurality of live points for the live movement time series data and each of a plurality of prerecorded points for the prerecorded movement time series data. The cost distance is a metric corresponding to the similarity between the live movement time series data and the prerecorded time series data and is indicative of the distance between the live movement time series data and the prerecorded time series data. If sufficiently small, the cost distance enables the user's live body movements in the live movement time series data to be "recognized" in the prerecorded time series data and implemented accordingly through the video game engine. After the cost distance is calculated, an in-game movement is implemented through the video game engine according to the cost distance between a selected point from the plurality of live points and a corresponding point from the plurality of prerecorded points. As a result, the user's body movements captured through the plurality of IMUs may thus be implemented through the video game engine. As shown in FIG. 4, the prerecorded movement time series data is retrieved from the computing device through the master microcontroller, enabling the master microcontroller to compare the prerecorded movement time series data that is stored on the computing device to the live movement time series data that is captured in real-time by the plurality of IMUs.

With reference to FIG. 2, in the preferred embodiment of the present invention, a specified movement is implemented as the in-game movement through the video game engine if the cost distance between the selected point and the corresponding point is less than a designated implementation threshold. The designated implementation threshold is a specified value for the cost distance at which a user's body movement in the live movement time series data is recognizable or unrecognizable as a corresponding movement in the prerecorded movement time series data. As a result, if the cost distance is sufficiently small, the specified movement is recognized and implemented through the video game engine. However, if the cost distance between the selected point and the corresponding point is greater than the designated implementation threshold, an alternative movement is implemented as the in-game movement through the video game engine as shown in FIG. 3. In this case, the cost distance between the selected point and the corresponding point is considered too large, rendering the user's body movement in the live movement time series data unrecognizable as the specified movement. As a result, the alternative movement is recognized as the movement that most closely correlates to the selected point in the live movement time series data and is implemented through the video game engine.

Figure 5:
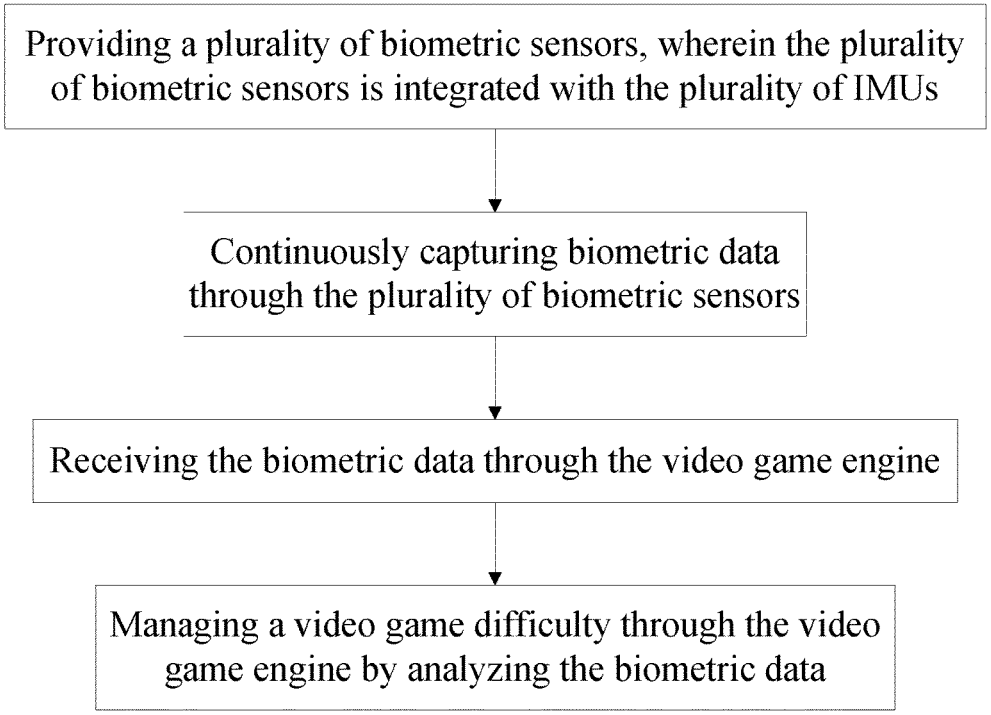
FIG. 5 is a flowchart depicting a secondary process that is followed by the present invention.

The present invention is utilized to control the user's gameplay experience through difficulty adjustment and sensory-enhancement. In the preferred embodiment of the present invention, difficulty adjustment is primarily regulated through biometrics. With reference to FIG. 5, the present invention utilizes a plurality of biometric sensors that is integrated with the plurality of IMUs. Biometric data is continuously captured through the plurality of biometric sensors while the user is playing. The biometric data is utilized to manage the user's gameplay experience. The biometric data is received through the video game engine for processing. A video game difficulty is managed through the video game engine by analyzing the biometric data. For example, if the plurality of biometric sensors detects that the user is struggling, the video game difficulty may be lowered. The video game difficulty is managed in order to prevent the user from overexerting while playing. An algorithm will be utilized to learn the user's threshold and increase or decrease the video game difficulty accordingly.

Figure 6:
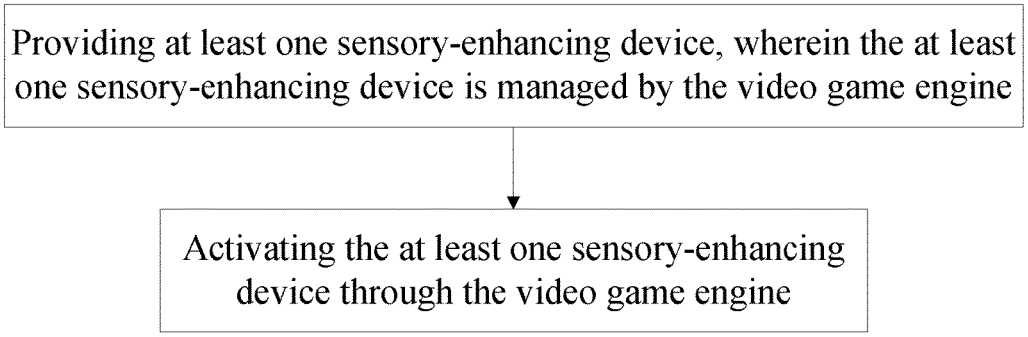
FIG. 6 is a flowchart depicting a secondary process that is followed by the present invention.

With reference to FIG. 6, the present invention may additionally utilize at least one sensory-enhancing device that is managed by the video game engine in order to deliver a personalized user gameplay experience. The at least one sensory-enhancing device is activated through the video game engine and may produce various effects. Effects that may be produced by the at least one sensory-enhancing device include, but are not limited to, fragrance and mist.

Figure 7:
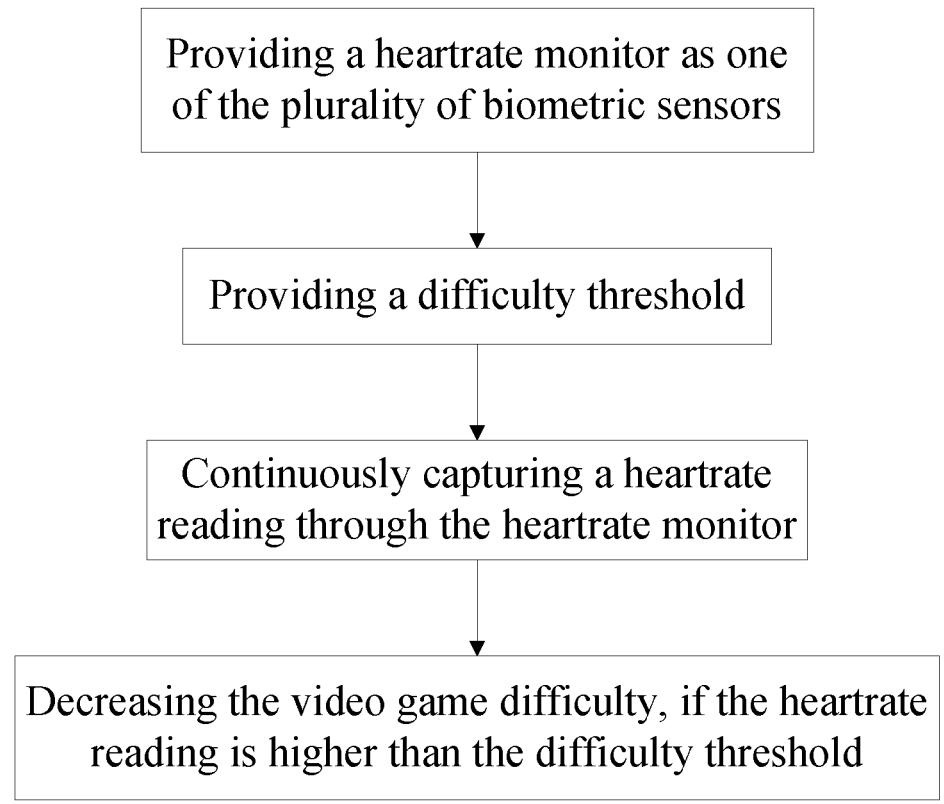
FIG. 7 is a flowchart depicting a secondary process that is followed by the present invention.

With reference to FIG. 7, a heartrate monitor is provided as one of the plurality of biometric sensors. The heartrate monitor detects the user's heartrate while the user is playing. A difficulty threshold serves as the point at which the video game engine increases or decreases the video game difficulty. A heartrate reading is continuously captured through the heartrate monitor, enabling the heartrate monitor to continuously monitor the user's heartrate while the user is playing. The video game difficulty is decreased if the heartrate reading is higher than the difficulty threshold as the heartrate reading being higher than the difficulty threshold is indicative of the user struggling.

Figure 8:
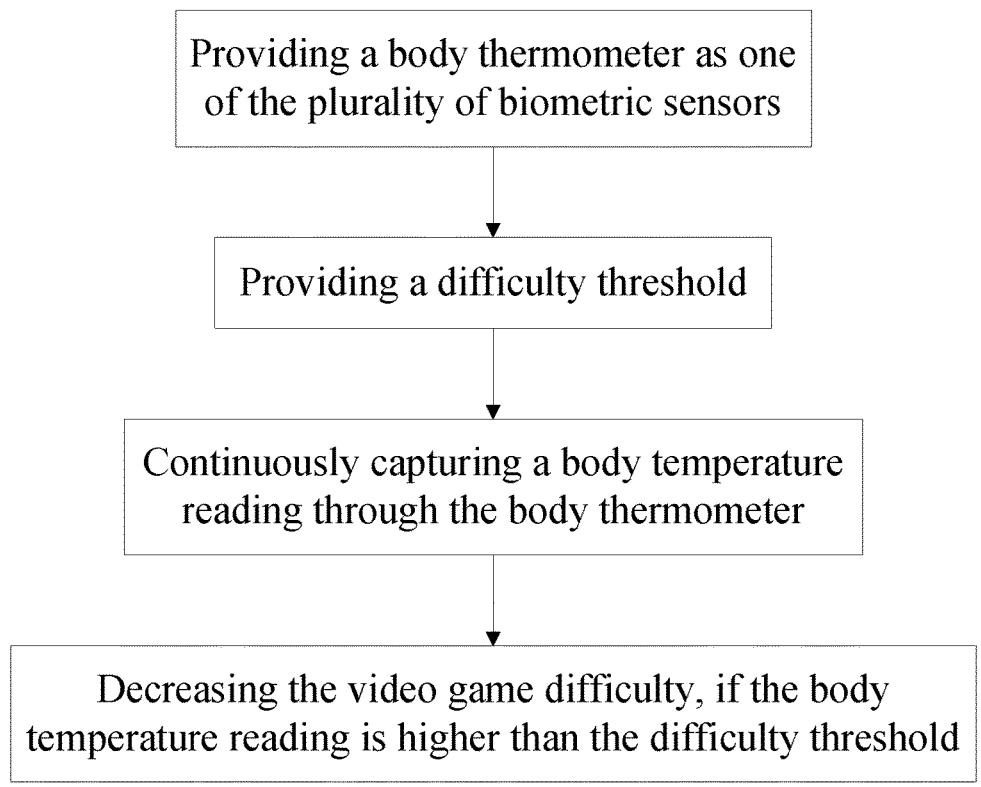
FIG. 8 is a flowchart depicting a secondary process that is followed by the present invention.

As shown in FIG. 8, a body thermometer is provided as one of the plurality of biometric sensors. The body thermometer detects the user's body temperature while the user is playing. A body temperature reading is continuously captured through the body thermometer, enabling the body thermometer to continuously monitor the user's body temperature while the user is playing. The video game difficulty is decreased if the body temperature reading is higher than the difficulty threshold as a high body temperature reading is indicative of the user exerting considerable effort.

Figure 9:
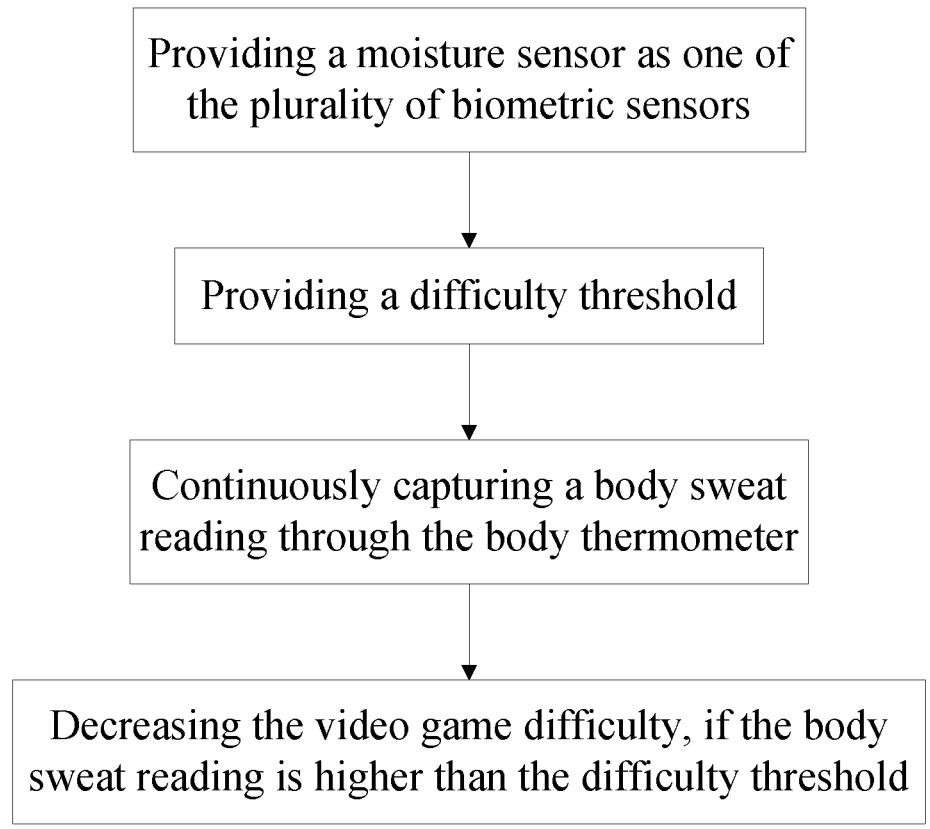
FIG. 9 is a flowchart depicting a secondary process that is followed by the present invention.

With reference to FIG. 9, a moisture sensor is provided as one of the plurality of biometric sensors. The moisture sensor detects moisture on the user's body while the user is playing. A body sweat reading is continuously captured through the moisture sensor in order to gauge the user's efforts while playing. The video game difficulty is decreased if the body sweat reading is higher than the difficulty threshold as a high body sweat reading is indicative of the user exerting significant physical effort.

Figure 10:
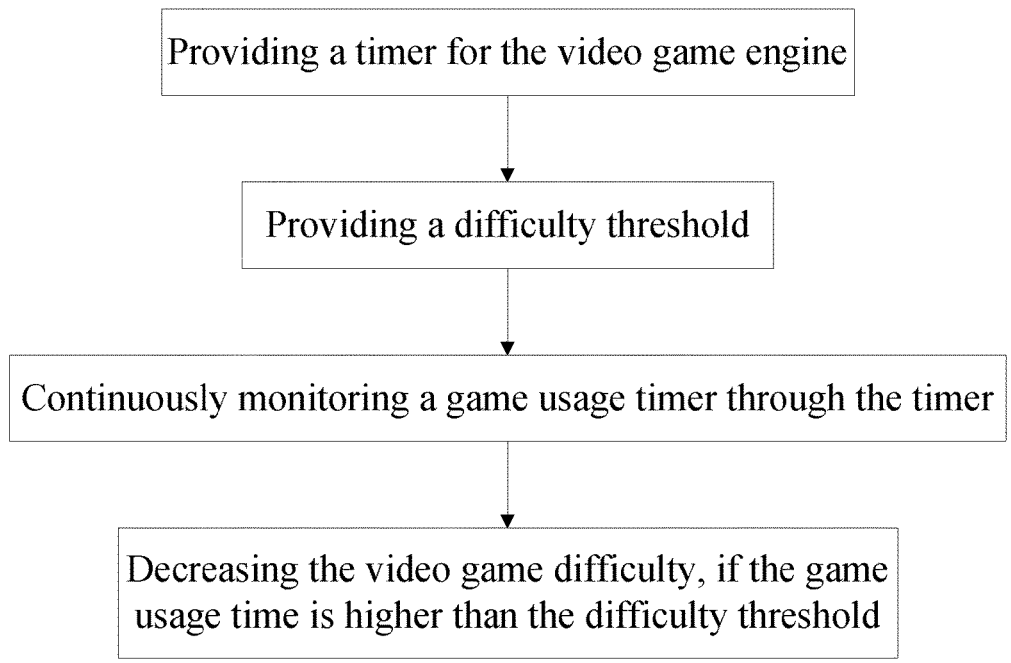
FIG. 10 is a flowchart depicting a secondary process that is followed by the present invention.

With reference to FIG. 10, a timer for the video game engine is utilized to measure the amount of time that the user has played. A game usage time is continuously monitored through the timer to manage the video game difficulty based on the amount of time that the user has played. The video game difficulty is decreased if the game usage timer is higher than the difficulty threshold, indicating that the user has played for an extensive amount of time.

Figure 11:
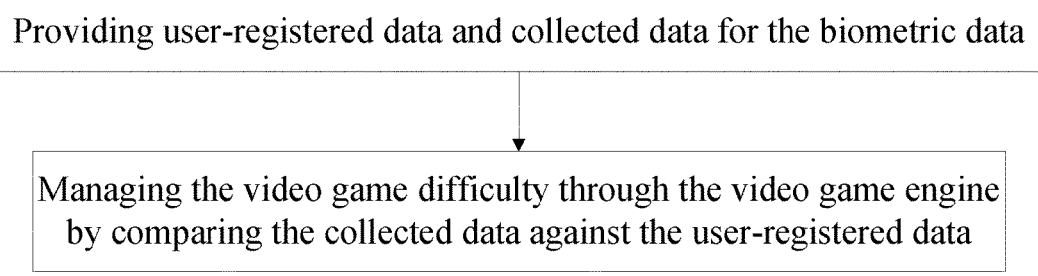
FIG. 11 is a flowchart depicting a secondary process that is followed by the present invention.

In the preferred embodiment of the present invention, the biometric data includes user-registered data as well as collected data as shown in FIG. 11. The user-registered data includes various user data such as body fat percentage, heartrate, age, weight, height, chest size, waist size, and hip size. The video game difficulty is managed through the video game engine by comparing the collected data against the user-registered data. As a result, the collected data that is gathered in real-time as the user plays is analyzed with respect to the user-registered data in order to provide personalized management of the video game difficulty. The present invention may utilize additional biometric hardware such as a fingerprint reader and a retina scanner in order to allow the user to unlock, authenticate, and use the computing device.

Figure 12:
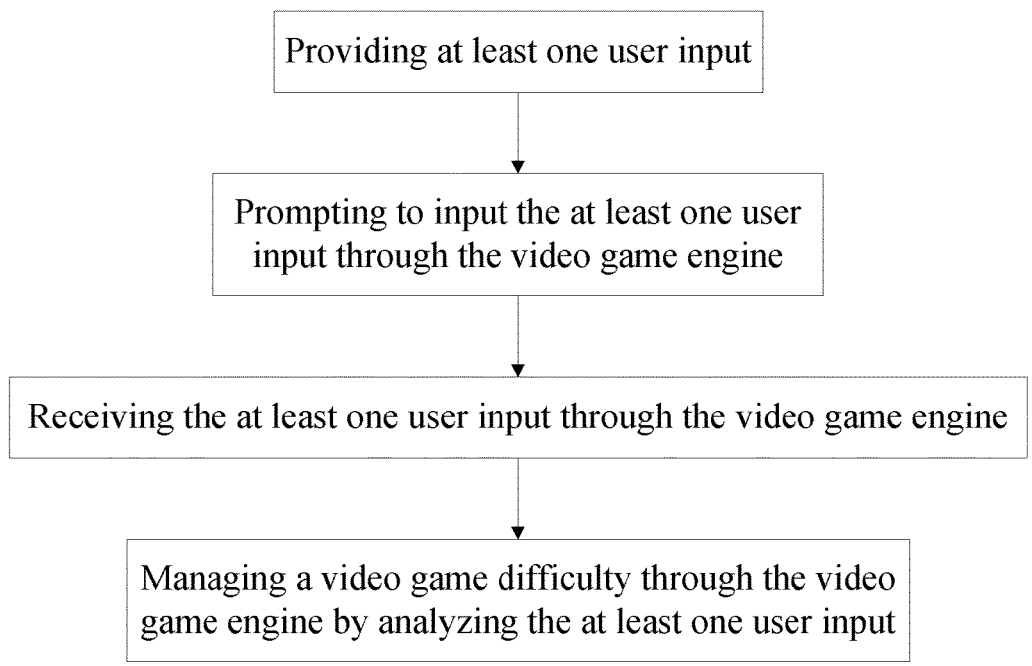
FIG. 12 is a flowchart depicting a secondary process that is followed by the present invention.

The video game difficulty may also be managed based on the user's input. With reference to FIG. 12, at least one user input is provided to enable the user to physically manage the video game difficulty. The user is prompted to input at least one user input through the video game engine. The prompt may be periodic or initiated by satisfaction of a condition such as the collected data (e.g. heartrate reading, body temperature, body sweat reading, game usage time) exceeding the difficulty threshold. The at least one user input is received through the video game engine for processing. The video game difficulty is managed through the video game engine by analyzing the at least one user input. The at least one user input may be manual (provided through a switch) or audible (provided through a microphone).

Figure 15:
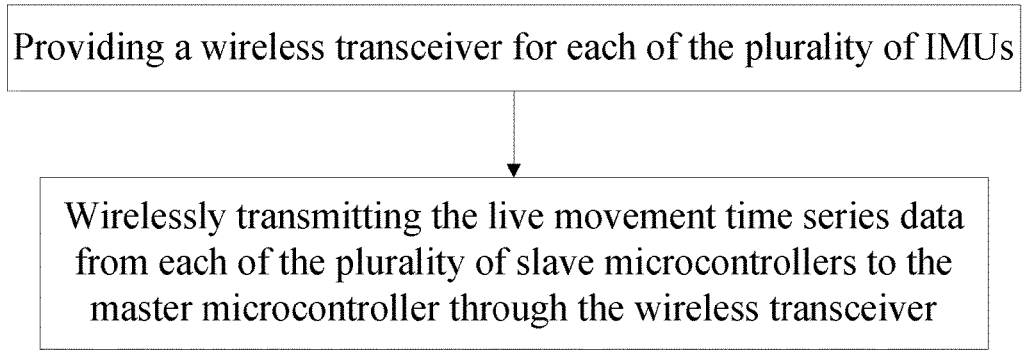
FIG. 15 is a flowchart depicting a secondary process that is followed by the present invention.

As seen in FIG. 15, each of the plurality of IMUs is able to utilize a wireless transceiver for wireless communication between the plurality of slave microcontrollers and the master microcontroller. The live movement time series data is wirelessly transmitted from each of the plurality of slave microcontrollers to the master microcontroller through the wireless transceiver. The use of the wireless transceiver eliminates any potential hindrances to the user's movement while the user is playing.

Figure 20:
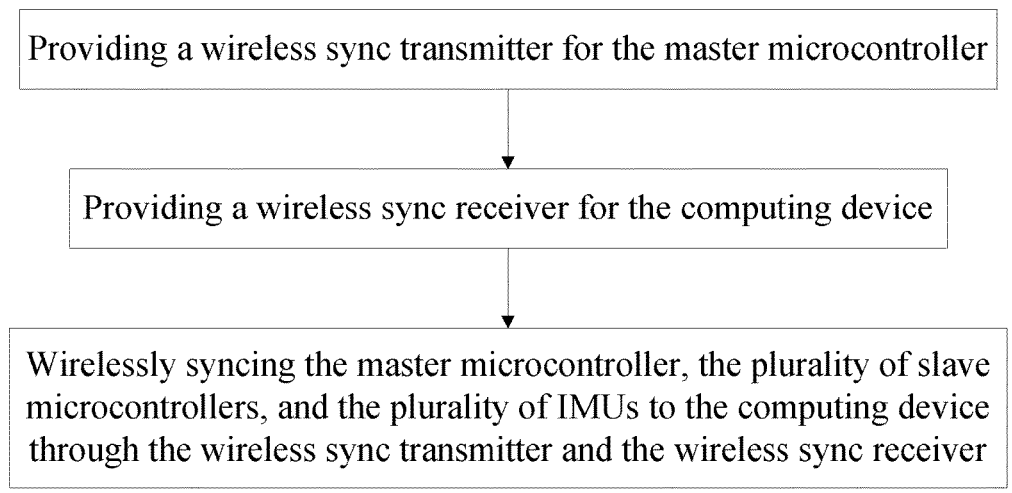
FIG. 20 is a flowchart depicting a secondary process that is followed by the present invention.

With reference to FIG. 20, a wireless sync transmitter for the master microcontroller and a wireless sync receiver for the computing device may be utilized to associate the master microcontroller, the plurality of slave microcontrollers, and the plurality of IMUs to the computing device, eliminating the need for a physical connection between the components. The master microcontroller, the plurality of slave microcontrollers, and the plurality of IMUs are wirelessly synced to the computing device through the wireless sync transmitter and the wireless sync receiver. The plurality of IMUs may then begin to capture and wirelessly transmit the live movement time series data to the master microcontroller through the plurality of slave microcontrollers. The master microcontroller is then able to wireless transmit the cost distance to the video game engine before the in-game movement is implemented.

Although the present invention has been explained in relation to its preferred embodiment, it is understood that many other possible modifications and variations can be made without departing from the spirit and scope of the present invention as hereinafter claimed.

What is claimed is:

1. A method for capturing and implementing body movement data through a video game engine, the method comprises the steps of:
    (A) providing a plurality of inertial measurement units (IMUs), a plurality of slave microcontrollers, a master microcontroller, a computing device, and a video game engine;
    (B) capturing live movement time series data through the plurality of IMUs;
    (C) receiving the live movement time series data through the plurality of slave microcontrollers;
    (D) continuously transmitting the live movement time series data from the plurality of slave microcontrollers to the master microcontroller;
    (E) continuously comparing the live movement time series data to prerecorded movement time series data through the master microcontroller in order to calculate a cost distance between each of a plurality of live points for the live movement time series data and each of a plurality of prerecorded points for the prerecorded movement time series data; and
    (F) implementing an in-game movement through the video game engine according to the cost distance between a selected point from the plurality of live points and a corresponding point from the plurality of prerecorded points.

2. The method for capturing and implementing body movement data through a video game engine as claimed in claim 1, the method comprises the steps of:
    implementing a specified movement as the in-game movement through the video game engine,
    if the cost distance between the selected point and the corresponding point is less than a designated implementation threshold.

3. The method for capturing and implementing body movement data through a video game engine as claimed in claim 1, the method comprises the steps of:
    implementing an alternative movement as the in-game movement through the video game engine,
    if the cost distance between the selected point and the corresponding point is greater than a designated implementation threshold.

4. The method for capturing and implementing body movement data through a video game engine as claimed in claim 1, the method comprises the steps of:
retrieving the prerecorded movement time series data from the computing device through the master microcontroller.

5. The method for capturing and implementing body movement data through a video game engine as claimed in claim 1, the method comprises the steps of:
providing a plurality of biometric sensors, wherein the plurality of biometric sensors is integrated with the plurality of IMUs;
continuously capturing biometric data through the plurality of biometric sensors;
receiving the biometric data through the video game engine; and
managing a video game difficulty through the video game engine by analyzing the biometric data.

6. The method for capturing and implementing body movement data through a video game engine as claimed in claim 1, the method comprises the steps of:
providing at least one sensory-enhancing device, wherein the at least one sensory-enhancing device is managed by the video game engine; and
activating the at least one sensory-enhancing device through the video game engine.

7. The method for capturing and implementing body movement data through a video game engine as claimed in claim 5, the method comprises the steps of:
providing a heartrate monitor as one of the plurality of biometric sensors;
providing a difficulty threshold;
continuously capturing a heartrate reading through the heartrate monitor; and
decreasing the video game difficulty,
if the heartrate reading is higher than the difficulty threshold.

8. The method for capturing and implementing body movement data through a video game engine as claimed in claim 5, the method comprises the steps of:
providing a body thermometer as one of the plurality of biometric sensors;
providing a difficulty threshold;
continuously capturing a body temperature reading through the body thermometer; and
decreasing the video game difficulty,
if the body temperature reading is higher than the difficulty threshold.

9. The method for capturing and implementing body movement data through a video game engine as claimed in claim 5, the method comprises the steps of:
providing a moisture sensor as one of the plurality of biometric sensors;
providing a difficulty threshold;
continuously capturing a body sweat reading through the moisture sensor; and
decreasing the video game difficulty,
if the body sweat reading is higher than the difficulty threshold.

10. The method for capturing and implementing body movement data through a video game engine as claimed in claim 5, the method comprises the steps of:
providing a timer for the video game engine;
providing a difficulty threshold;
continuously monitoring a game usage time through the timer; and
decreasing the video game difficulty,
if the game usage time is higher than the difficulty threshold.

11. The method for capturing and implementing body movement data through a video game engine as claimed in claim 5, the method comprises the steps of:
providing user-registered data and collected data for the biometric data; and
managing the video game difficulty through the video game engine by comparing the collected data against the user-registered data.

12. The method for capturing and implementing body movement data through a video game engine as claimed in claim 1, the method comprises the steps of:
providing at least one user input;
prompting to input the at least one user input through the video game engine;
receiving the at least one user input through the video game engine; and
managing a video game difficulty through the video game engine by analyzing the at least one user input.

13. The method for capturing and implementing body movement data through a video game engine as claimed in claim 1, wherein each of the plurality of IMUs is electronically connected to a corresponding microcontroller from the plurality of slave microcontrollers.

14. The method for capturing and implementing body movement data through a video game engine as claimed in claim 1, wherein the master microcontroller is communicatively coupled to the computing device and the plurality of slave microcontrollers, and wherein the video game engine is installed onto a storage device of the computing device.

15. The method for capturing and implementing body movement data through a video game engine as claimed in claim 1, the method comprises the steps of:
providing a wireless transceiver for each of the plurality of IMUs; and
wirelessly transmitting the live movement time series data from each of the plurality of slave microcontrollers to the master microcontroller through the wireless transceiver.

16. The method for capturing and implementing body movement data through a video game engine as claimed in claim 1, wherein the plurality of IMUs includes a first wrist IMU, a second wrist IMU, a first ankle IMU, and a second ankle IMU.

17. The method for capturing and implementing body movement data through a video game engine as claimed in claim 1, wherein each of the plurality of IMUs comprises at least one accelerometer and at least one gyroscope.

18. The method for capturing and implementing body movement data through a video game engine as claimed in claim 1, the method comprises the steps of:
providing a connection wire for the master microcontroller; and
electronically connecting the master microcontroller to the computing device through the connection wire.

19. The method for capturing and implementing body movement data through a video game engine as claimed in claim 1, the method comprises the steps of:
providing a wireless communication module for the master microcontroller; and
electronically connecting the master microcontroller to the computing device through the wireless communication module.

20. The method for capturing and implementing body movement data through a video game engine as claimed in claim 1, the method comprises the steps of:

providing a wireless sync transmitter for the master microcontroller;
providing a wireless sync receiver for the computing device; and
wirelessly syncing the master microcontroller, the plurality of slave microcontrollers, and the plurality of IMUs to the computing device through the wireless sync transmitter and the wireless sync receiver.

\* \* \* \* \*